(12) United States Patent
Thomas

(10) Patent No.: US 9,358,987 B2
(45) Date of Patent: Jun. 7, 2016

(54) PROTECTIVE STRUCTURE FOR TANK TOP FITTINGS

(71) Applicant: Gunderson LLC, Portland, OR (US)

(72) Inventor: Bradley J. Thomas, Beaverton, OR (US)

(73) Assignee: Gunderson LLC, Portland, OR (US)

( * ) Notice: Subject to any disclaimer, the term of this patent is extended or adjusted under 35 U.S.C. 154(b) by 0 days.

(21) Appl. No.: 14/625,485

(22) Filed: Feb. 18, 2015

(65) Prior Publication Data

US 2015/0291184 A1    Oct. 15, 2015

Related U.S. Application Data

(63) Continuation-in-part of application No. 14/251,473, filed on Apr. 11, 2014.

(51) Int. Cl.
| | | |
|---|---|---|
| *B61D 5/00* | (2006.01) | |
| *B65D 90/00* | (2006.01) | |
| *B23K 31/02* | (2006.01) | |

(52) U.S. Cl.
CPC . *B61D 5/08* (2013.01); *B23K 31/02* (2013.01); *B23K 2201/006* (2013.01); *B23K 2201/12* (2013.01); *B23K 2203/04* (2013.01)

(58) Field of Classification Search
CPC .............. B61D 5/00; B61D 5/06; B61D 5/04; B61D 5/08
See application file for complete search history.

(56) References Cited

U.S. PATENT DOCUMENTS

| | | | | |
|---|---|---|---|---|
| 2,102,124 A | * | 12/1937 | Lithgow ................. | B61D 5/008 105/358 |
| 2,558,648 A | * | 6/1951 | Gausmann ........... | B65D 88/744 105/358 |
| 3,599,575 A | * | 8/1971 | Yurkoski ................. | B61D 7/00 105/358 |
| 3,994,239 A | * | 11/1976 | Baker ..................... | B61D 5/06 105/358 |
| 4,217,830 A | * | 8/1980 | Himmelheber, Sr. .... | B61D 5/06 105/360 |
| 4,304,271 A | | 12/1981 | Mowatt-Larssen | |
| 4,466,356 A | * | 8/1984 | Messersmith ............ | B61D 5/06 105/358 |

(Continued)

OTHER PUBLICATIONS

Kathi Kube, Rollover Tank Car Test, web posting, Dec. 23, 2009, article appearing on Trains Magazine web site, article downloaded from URL http://trn.trains.com/railroads/2009/12/rollover-tank-car-test on Feb. 12, 2015.

*Primary Examiner* — Jason C Smith
(74) *Attorney, Agent, or Firm* — Chernoff, Vilhauer, McClung & Stenzel, LLP

(57) ABSTRACT

A railway tank car including a protective structure for the top of its cargo tank and surrounding a valve group mounting nozzle and a pressure relief safety valve nozzle, to protect the associated valves against damage resulting from the car being overturned, particularly while the railcar is moving along a railway. The protective structure includes an upstanding wall of metal plate that surrounds and is located at a radial distance outwardly apart from the tank top valve group mounting nozzle. A reinforcing band is attached to an upper portion of the upstanding wall to enhance its strength. Also disclosed is a method of protecting fittings mounted on a nozzle on the tank top of a railway tank car by providing and mounting such a protective structure to surround the tank top nozzle and associated fittings.

20 Claims, 14 Drawing Sheets

(56) References Cited

U.S. PATENT DOCUMENTS

| | | | | |
|---|---|---|---|---|
| 4,527,489 | A * | 7/1985 | Schlink | B61D 5/08 105/358 |
| 4,542,764 | A * | 9/1985 | Brittingham | B61D 5/08 105/358 |
| 4,674,674 | A * | 6/1987 | Patterson | B60P 3/22 220/592.2 |
| 4,805,540 | A * | 2/1989 | Mundloch | B61F 1/02 105/358 |
| 4,941,410 | A * | 7/1990 | Dalrymple | B61D 5/08 105/358 |
| 5,218,911 | A * | 6/1993 | Rehbein | B61D 5/00 105/358 |
| 5,351,625 | A * | 10/1994 | Culligan | B61D 5/06 105/362 |
| 5,465,753 | A * | 11/1995 | Schwartz | B61D 5/04 105/358 |
| 5,467,719 | A * | 11/1995 | Dalrymple | B61D 5/06 105/362 |
| 6,357,363 | B1 * | 3/2002 | Miltaru | B61F 1/10 105/358 |
| 6,390,119 | B1 * | 5/2002 | Crochet | F16K 27/08 105/360 |
| 6,742,550 | B2 * | 6/2004 | Caparros | B65D 90/10 137/347 |
| 6,910,427 | B2 * | 6/2005 | Woodall | B65D 90/10 105/358 |
| 6,949,415 | B2 * | 9/2005 | Alcoe | H01L 23/10 257/E23.135 |
| 7,849,801 | B2 | 12/2010 | Dalrymple et al. | |
| 7,849,802 | B2 | 12/2010 | Dalrymple | |
| 2002/0195019 | A1 * | 12/2002 | Woodall | B61D 5/04 105/358 |
| 2003/0141586 | A1 * | 7/2003 | Alcoe | H01L 23/10 257/710 |
| 2004/0164401 | A1 * | 8/2004 | Alcoe | H01L 23/10 257/704 |
| 2006/0185554 | A1 * | 8/2006 | Dalrymple | B61D 5/08 105/358 |
| 2007/0125259 | A1 * | 6/2007 | Dalrymple | B61D 5/08 105/236 |
| 2008/0035015 | A1 * | 2/2008 | Simpson | B61D 5/00 105/360 |
| 2008/0265094 | A1 * | 10/2008 | Van Der Veen | B23K 20/122 244/123.1 |
| 2010/0319571 | A1 * | 12/2010 | Dalrymple | B61D 5/06 105/362 |
| 2014/0000474 | A1 * | 1/2014 | Mckisic | B61D 5/06 105/358 |
| 2015/0135986 | A1 | 5/2015 | Saxton et al. | |

* cited by examiner

PROTECTIVE STRUCTURE FOR TANK TOP FITTINGS

BACKGROUND AND SUMMARY OF THE INVENTION

The present invention is related to railway tank cars and in particular to a protective structure for the various valves ordinarily present on the top of a cargo tank of such a railway tank car.

Nozzles have long been provided on the top of a railway tank car as manways and as locations for mounting groups of valves, including those used to fill a cargo tank with a fluid cargo, to remove the fluid cargo from the cargo tank, and to protect against excessive internal pressure. It has long been recognized that the nozzles are susceptible to being broken loose from the tank and that the valves can be broken in the event of a rollover of a railway tank car. Various housings have been used in the past to protect the valves, but they have been attached to a nozzle or a valve-mounting plate fastened to a nozzle. Various strengthened and reinforced nozzle structures have been provided in order to resist breakage of the nozzles in the case of a rollover, but previously known protective structures have failed when tank cars have overturned while moving along a railway.

Railway industry regulations require structures intended to protect tank top fittings on railway tank cars to be able to withstand longitudinally-applied forces equal to the weight of the cargo tank and its lading, and to be able to withstand laterally-applied forces of half that magnitude well enough to prevent failure of the fittings protected by such structures.

At least until recently, it had been considered unnecessary and an undesirable addition of weight to a railroad tank car to provide a strong protective structure surrounding a manway nozzle or a valve group nozzle on the top of a railroad tank car. Instead, welded gussets and various arrangements of strengthening of the attachment of a nozzle to the top of a cargo tank had been used in the past, as well as protective bells that can be attached to the valve group mounting plate to surround the valves and protect the valves themselves from damage in collisions and overturning. While previously available protection for the top of a tank car has value, various events have recently proven that protection to be insufficient in the case of overturning of railroad tank cars in motion along a railroad track.

What is needed, then, is a substantial yet not overly massive structure for protecting the various valves on the top of a cargo tank of a railway tank car, to prevent loss of cargo, and particularly to prevent escape of dangerous gaseous cargo or flammable liquid cargo, in the event of derailment and overturning of a moving railway tank car. Such a protective structure should not be so heavy as to add significantly to the fuel requirements for moving the car along the railway, yet it should be of ample strength. It is desirable also to have a protective structure on the top of a cargo tank be no larger than necessary, in order that it be a smaller target which can collide with an obstruction on the ground in the case of a rollover.

In a railway tank car that includes one embodiment of the invention disclosed herein, a substantial mounting, or bolting, flange is mounted in a first opening in the top of the cargo tank at a position lower than the position of a bolting flange for receiving a mounting plate for groups of valves and related fittings in a traditional nozzle.

In one embodiment of the structure disclosed herein for the top of a cargo tank of a railway car, a protective housing of plate metal extends upward from the top of the cargo tank and surrounds the nozzle for a valve group bolting flange and a mounting plate bolted to the flange, extending upward at least to the height of the highest valve or other fitting mounted on the valve group mounting plate.

In one embodiment of the structure of the top of a cargo tank for a railway tank car as disclosed herein, a pressure relief safety valve is mounted on a flange carried on a nozzle located at a second opening through the tank top, spaced a small distance apart from the valve group and fittings nozzle, and an auxiliary protective housing of metal plate construction extends around the nozzle and flange and has a pair of parallel side portions extending to and attached to the protective housing surrounding the valve group nozzle and its bolting flange. The auxiliary housing also acts as a bolster to help support the protective housing surrounding the valve group mounting plate.

In one embodiment, the auxiliary protective housing surrounding the pressure relief safety valve nozzle may be upwardly open to provide a path for fluids escaping through the pressure relief valve.

A railway tank car that includes one embodiment of the tank top protective structure disclosed herein includes a tank top reinforcement in the form of a doubler plate attached to the outer surface of the tank top, such as by welding, and a protective structure configured to the tank top and including an upstanding wall of metal plate is welded to the reinforcement doubler plate and is located radially outwardly spaced apart from the mounting flange of the valve group nozzle, so as to protect fittings mounted the nozzle.

Such a protective structure in one embodiment of the railway tank car disclosed herein includes a reinforcing band located on an upper portion of the upstanding wall to strengthen the reinforcing structure in the areas most likely to be subjected to external forces in the event of a rollover, yet avoid adding weight unnecessarily to the tank car.

The protective structure disclosed herein may be efficiently added to a conventional railway tank car to make such a car significantly less vulnerable to catastrophic damage and loss of fluid cargo in the event of a rollover.

The foregoing and other objectives and features of the invention will be more readily understood upon consideration of the following detailed description of the invention taken in conjunction with the accompanying drawings.

DETAILED DESCRIPTION OF AN EMBODIMENT

Figure 1:
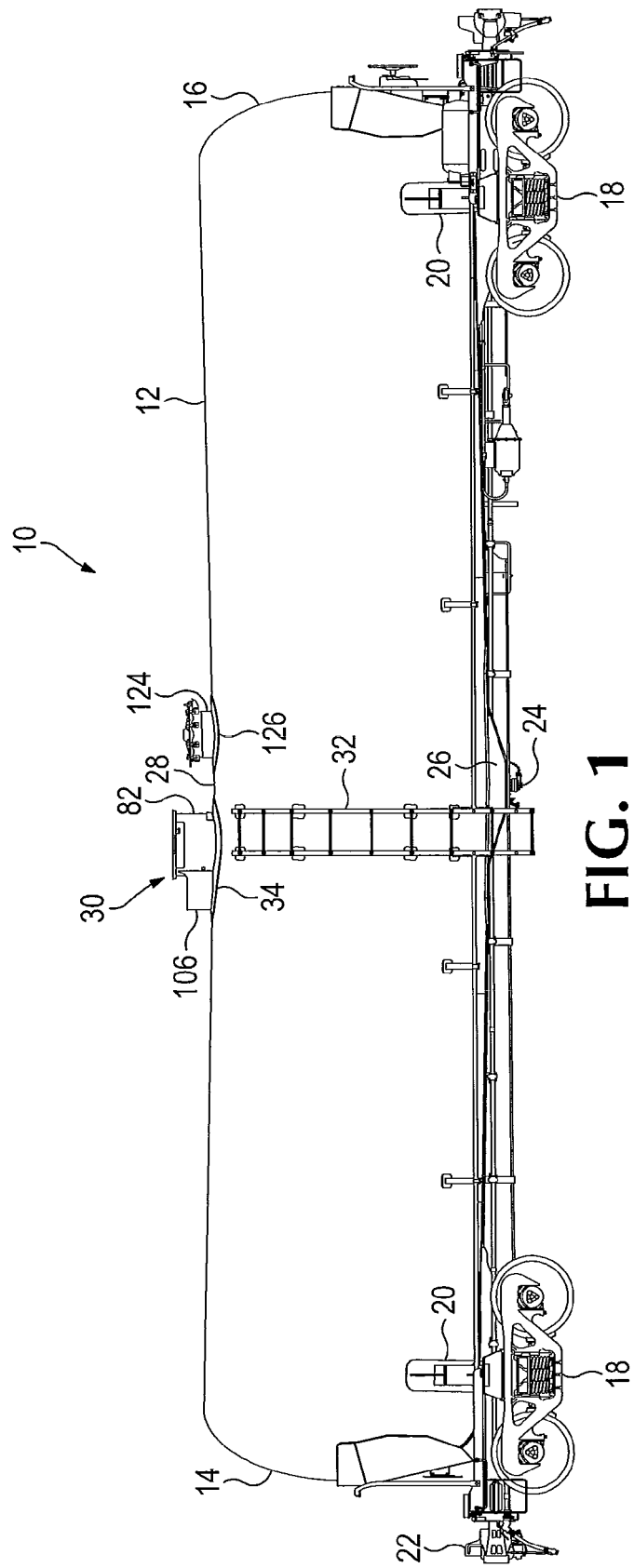
FIG. 1 is a side elevational view of a railway tank car, including a protective structure that is an embodiment of the present invention, for protecting various valves mounted on the top of the cargo tank of a railway tank car.

Referring now to the drawings which form a part of the disclosure herein, a railroad tank car 10 shown in FIG. 1 may include a generally cylindrical cargo tank 12 having a longitudinal axis 13. The opposite ends 14, 16 of the cargo tank 12 are closed, and the cargo tank 12 may be supported by a pair of wheeled trucks 18 that may be attached to the cargo tank 12 by appropriate conventional saddles and bolsters 20 connected with an outer surface of the cargo tank 12. The cargo tank 12 itself may be constructed with significant enough rigidity and strength not only to be self-supporting, but to bear the longitudinal train loads exerted on the tank car 10 during travel.

A conventional double shelf coupler 22 may be provided at each end of the car. Centrally located in the bottom of the cargo tank there may be a bottom outlet valve 24 and conventional protective structures 26.

Located about mid-length of the tank car 10 and centrally along the top 28 of the cargo tank 12 is a protective structure 30. There may also be a walkway and a suitable handrail (neither shown) alongside the protective structure, as well as a ladder 32 leading along the outside of the cargo tank toward the bottom of the car 10.

As shown at an enlarged scale in FIGS. 2-7, the protective structure 30 may be attached to a doubler plate such as a nozzle reinforcement pad 34 welded to an outer surface of the tank top 28 of the cargo tank 12. The nozzle reinforcement pad 34 may be a tapered oval in shape and may extend along the tank top 28 in a longitudinal direction with respect to the cargo tank 12. The nozzle reinforcement pad 34 may have a thickness 36 of, for example, about 0.5 inch, and may be of ASTM A 516 GR 70 steel.

Mounted on the cargo tank 12 at the location of the nozzle reinforcement pad 34 is a nozzle 40 provided with a closure member such as a valve group mounting plate 42 on which at least two valves may be mounted.

In order to reduce the likelihood of rollover damage to the nozzle 40 where the valve group mounting plate 42 is attached to the tank top, the nozzle 40 includes a bolting flange 44 for the valve group mounting plate 42 that is mounted on the tank top 28 at a lower height than has previously been known. A part 46 of the bolting flange 44 is located lower than the interior surface 47 of the cargo tank shell plating 48 at the tank top 28. A hoop-like bolting flange attachment skirt 50 of metal plate which may be generally cylindrical is securely fastened, as by welding, to the shell plating 48 of the cargo tank 12. The attachment skirt 50 extends above the cargo tank shell plating 48 and the nozzle reinforcement pad 34 mounted on the exterior of the cargo tank 12 by an exposure distance 52 such as about 1.25 inches, great enough to allow the attachment skirt 50 to be welded to the nozzle reinforcement pad 34 and to extend upwardly to a flat horizontal upper margin including a rim surface 54. A lower margin 56 of the attachment skirt 50 may be shaped to correspond with the shape of the opening through the cargo tank shell plating 48 for the nozzle 40. The attachment skirt 50 may extend downwardly within the interior of the cargo tank 12, preferably by a uniform distance, such as, for example, 0.25 to 0.50 inch, beyond the interior surface 47 of the shell plating 48, to present ample material of the attachment skirt 50 to be welded securely to the interior of the cargo tank shell plating 48.

The bolting flange 44 may be an annular monolithic steel member that fits snugly within the interior of the bolting flange attachment skirt 50 and is welded to the skirt 50, at both its upper margin 55, aligned with the top surface 54 of the bolting flange attachment skirt 50, and its lower margin 57. The bolting flange 44 may extend inward by a substantial radial width 60, such as about 3 inches, from the interior surface of the bolting flange attachment skirt 50 and may have a substantial vertical thickness or height 62 such as, for example, about 2 inches, so as to provide ample support for the plating 48 of the cargo tank 12, the nozzle reinforcement pad 34, and the bolting flange attachment skirt 50.

Figure 4:
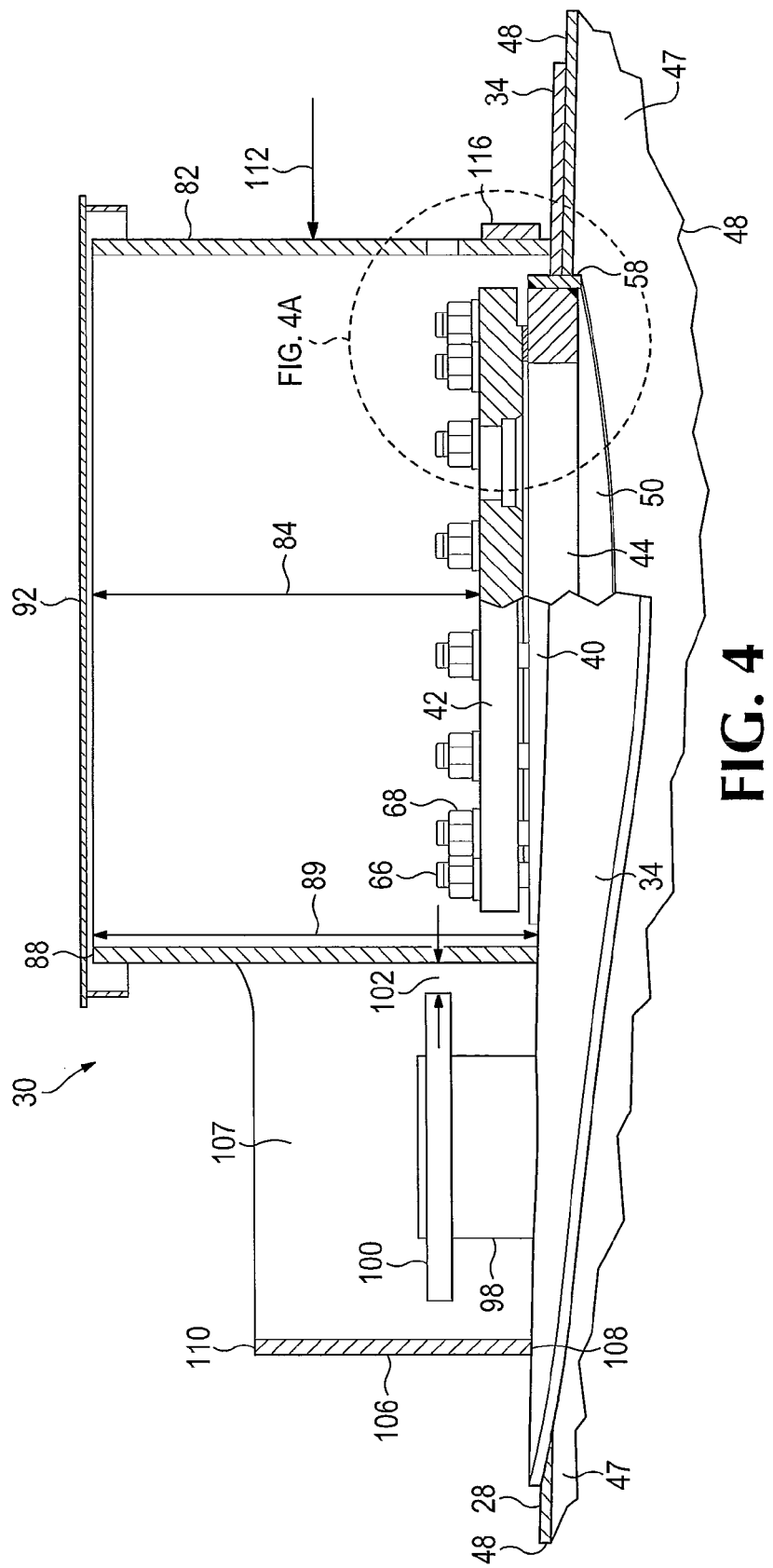
FIG. 4 is a sectional view, taken along the line 4-4 in FIG. 3.
Figure 4A:
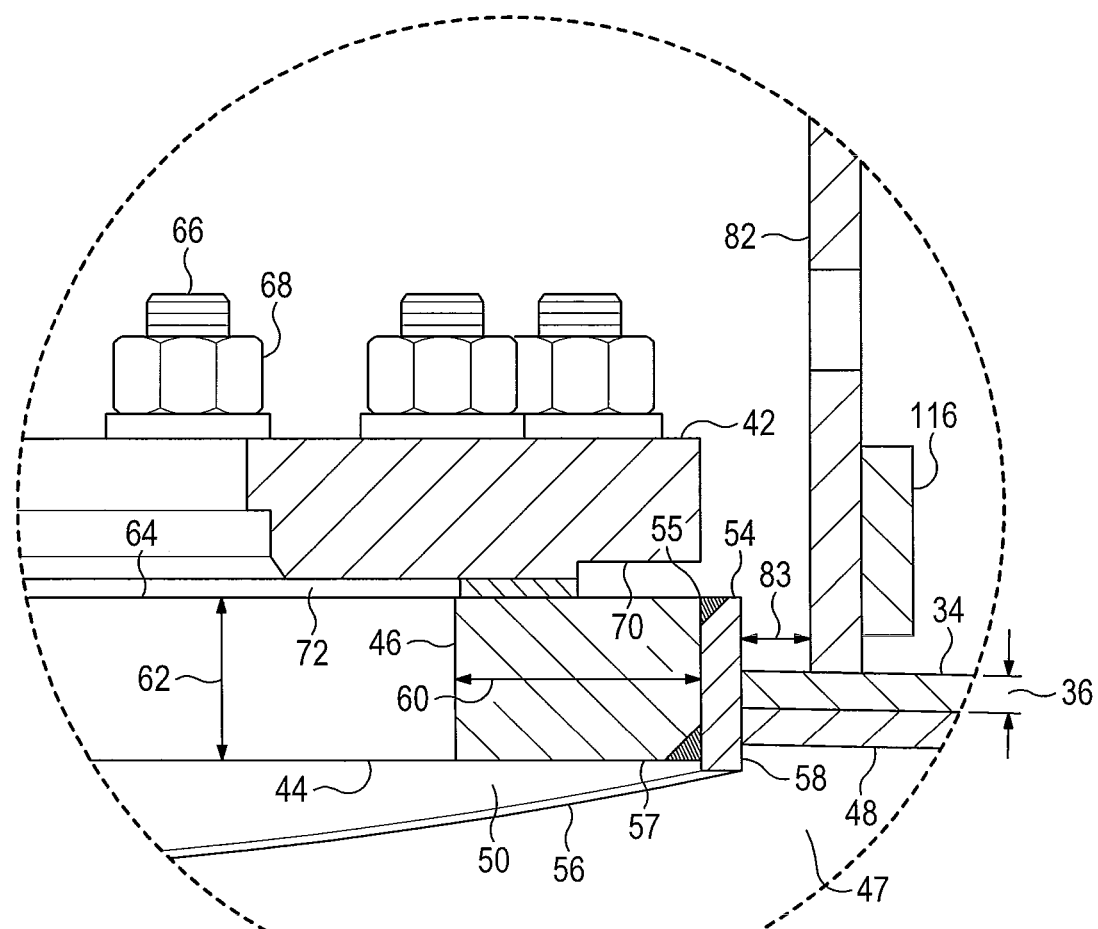
FIG. 4A is a detail view, at an enlarged scale, of the circled portion of FIG. 4.
Figure 5:
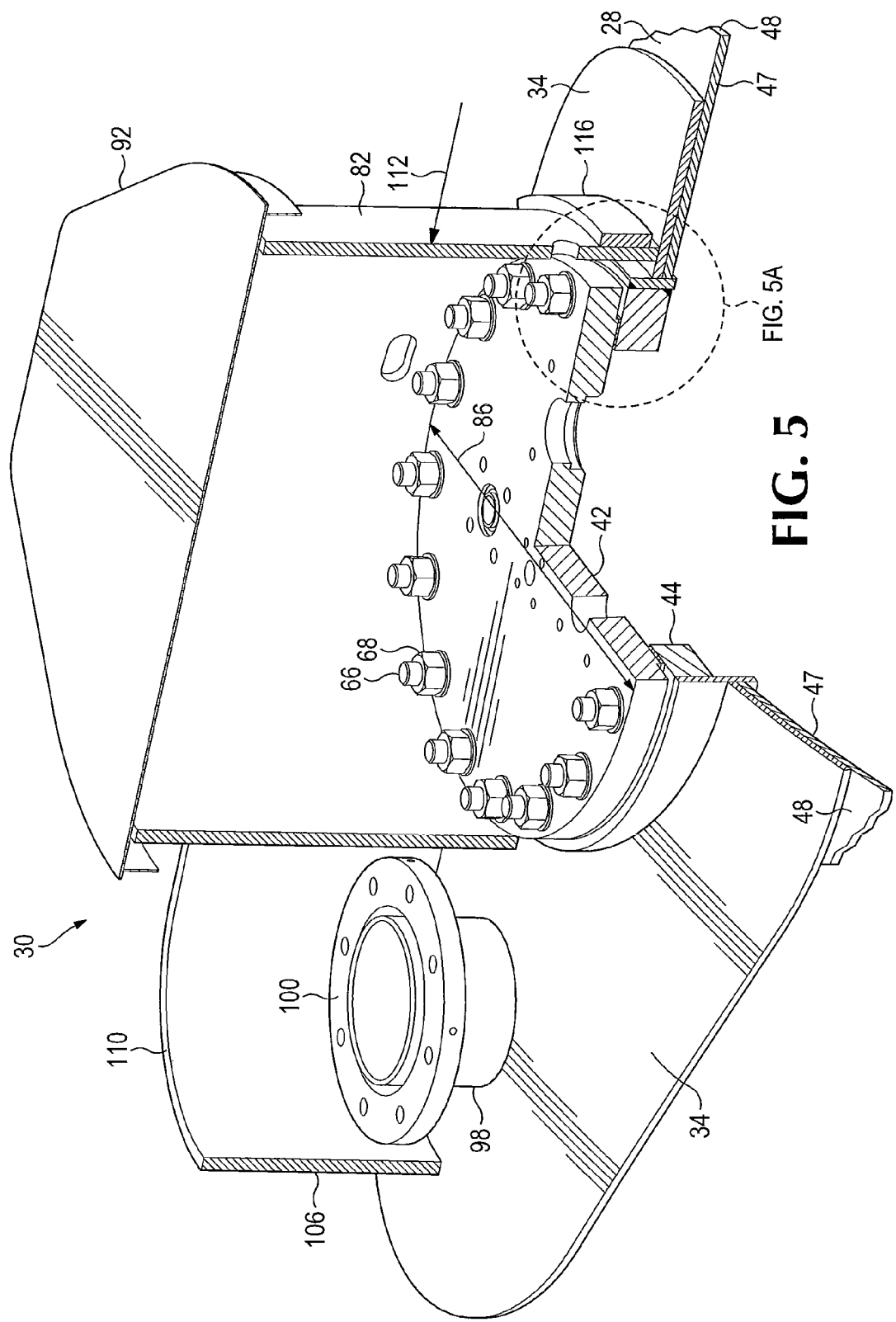
FIG. 5 is a partially cutaway isometric view taken from the upper right end of the portion of a railway tank car shown in FIG. 2.
Figure 5A:
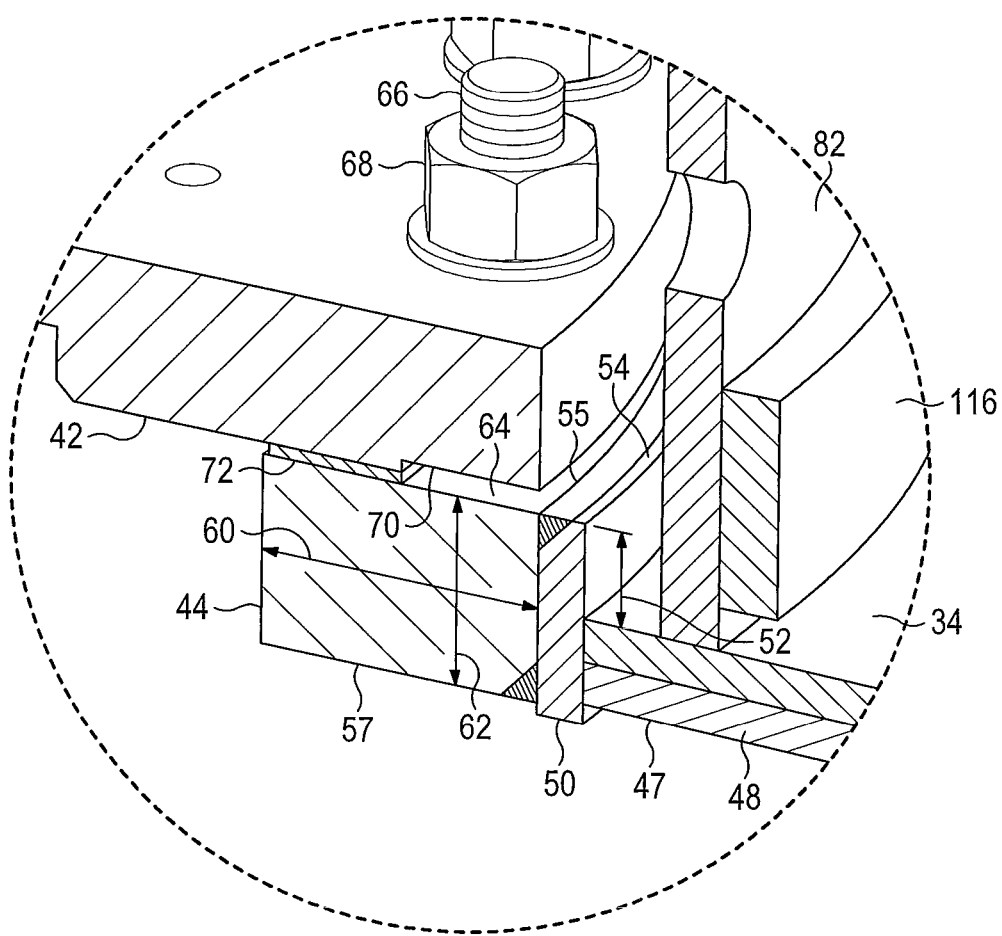
FIG. 5A is a detail view, at an enlarged scale, of the circled portion of FIG. 5.
Figure 6:
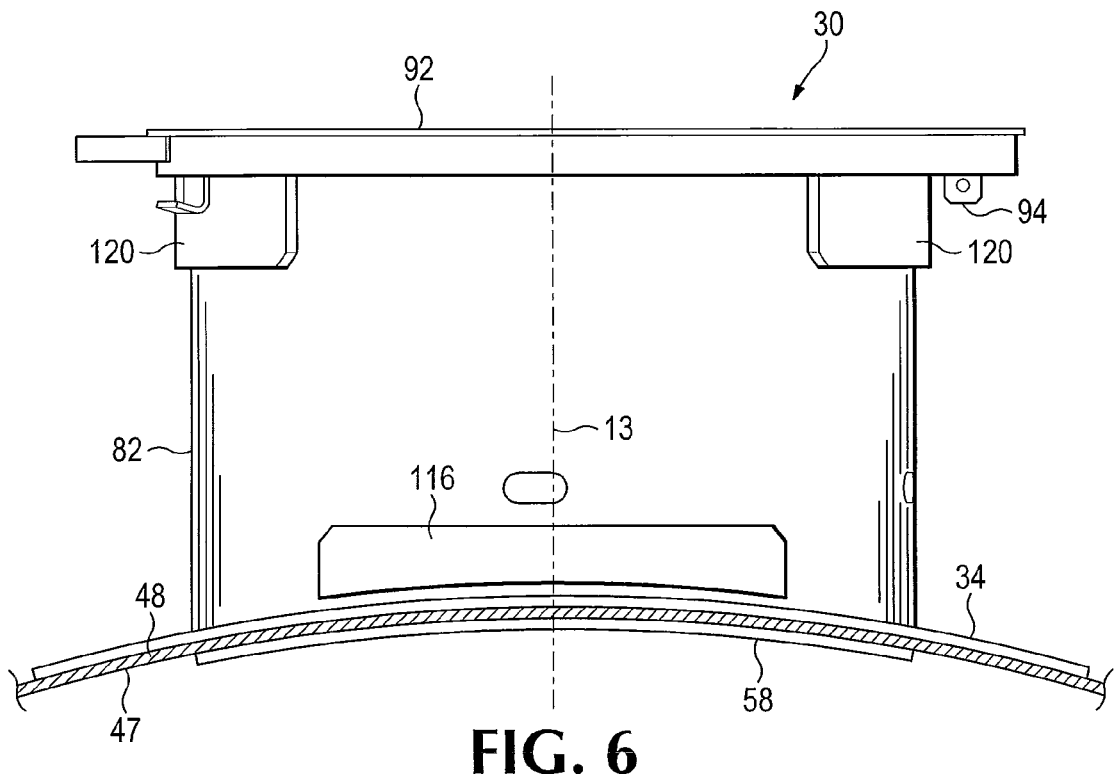
FIG. 6 is an end elevational view of the portion of a tank car shown in FIG. 2, taken in the direction of the line 6-6 in FIG. 3.

An upper face 64 of the bolting flange 44 may be planar, and a plurality of bolts 66 may be fastened to the bolting flange 44 and extend upwardly from the upper surface 64 in a circular arrangement. For example, the bolts 66 may be studs threaded into the bolting flange 44 and may be spaced apart from one another uniformly around the bolting flange 44. The upper face 64 of the bolting flange 44 may be flush with the upper face 54 of the bolting flange attachment skirt 50, as may be seen best in FIGS. 4A and 5A.

The valve group and fittings mounting plate 42 is provided with holes arranged to fit snugly over the bolts 66 and is fastened to the bolting flange 44 by nuts 68 threaded onto the bolts 66.

An outer margin portion 70 of the underside of the valve group and fittings mounting plate 42 may be undercut, and a suitable annular gasket 72 is fitted between the upper surface 64 of the radially inner part of the bolting flange and the full-thickness part of the mounting plate 42. The circular arrangement of the bolts 66, located radially outward from the gasket 72, may aid in keeping the gasket 72 in its desired location, while the undercut outer margin portion 70 of the mounting plate 42 directs tension in the bolts 66 to the full-thickness part of the mounting plate 42 to keep pressure on the gasket 72.

Various valves are mounted on the valve group and fittings mounting plate 42. For example, there may be a 3-inch diameter cargo delivery and removal valve 76 and a 2-inch diameter pressurized fluid admission valve 78. The cargo valve 76 may be connected with a fill pipe that extends nearly to the bottom of the cargo tank 12 to deliver cargo into the cargo tank 12 or to be used as a suction line to remove cargo from a sump in the bottom of the cargo tank 12. The fluid admission valve 78 may be used for introduction of pressurized air to aid in emptying the cargo tank 12, for example.

The protective structure 30 may include a protective housing 82 that encircles the flange attachment bolting skirt 50 and is fastened to the cargo tank 12 as by being welded to the nozzle reinforcement doubler pad 34. The protective housing 82 may be spaced outward from the exterior of the flange attachment bolting skirt 50 by a radial distance 83 of 0.75 inch, for example, affording room for welding the interior face of the protective housing 82 to the cargo tank 12 by welding it to the exterior surface of the nozzle reinforcement pad 34, and providing space around the valve group and fittings mounting plate 42. The protective housing 82 may also be of a suitable relatively high-strength steel such as, for example, A516 GR 70 plate 0.625 inch thick, although a higher strength steel or greater thickness may be determined by engineering calculations to be better able to withstand potential forces, depending on the designed size and capacity of the tank car 10. The protective housing 82 extends upward to a height 84 above the valve and fittings mounting plate to at least the height of the tallest of the valves 76 and 78 or other fittings expected to be mounted on the mounting plate 42.

Because a pressure relief safety valve that is commonly the tallest valve associated with the top of a cargo tank of a railway tank car is not located on the valve group and fittings mounting plate 42, the protective housing 82 may have a shorter height 84 than would be necessary were the pressure relief safety valve mounted on the valve group mounting plate 42. Additionally, with fewer valves mounted on the valve group and fittings mounting plate 42, because of the pressure relief safety valve being mounted elsewhere, the diameter 86 of the valve group mounting plate 42 can be smaller, for example, about 25 inches.

Thus, the top 88 of the protective housing 82 may, for example, be located only about 16 inches above the upper face of the valve group and fittings mounting plate 42. The height 89 of the top 88 of the valve group protective housing may thus be less than 18.5 inches above the nozzle reinforcement pad 34 at the longitudinal centerline of the tank top 28. The height 90 of the top 88 of the protective housing 82 will be greater at the furthest lateral part of the protective housing 82, because of the downward curvature of the cargo tank 12, where the height 90 may be about 20 inches. Because the bolting flange 44 is mounted low, at the lowest practical location with respect to the tank top, the protective housing 82 extends upward above the tank top 28 of the cargo tank 12 by a minimum distance, resulting in a minimized exposure of the valves 76 and 78 and any other tank top fittings to damage in the event of the railway tank car 10 being overturned.

A lid 92, which may be constructed of heavy sheet metal, may be mounted on the top 88 of the protective housing 82 by a hinge 94 to cover the space defined by the protective housing 82 surrounding the valve group nozzle 40 and the associated valves. The hinged lid 92 provides protection of the valves 76 and 78 on the valve group and fixtures mounting plate 42 from the weather and from easy tampering and may be secured in a manner by which any tampering is clearly evident, such as by a hasp and padlock arrangement (not shown) connecting the lid 92 to the opposite side of the protective housing 82 with an accompanying tamper-evident seal. The lid 92 may be raised to provide access to the valves 76 and 78 and other fittings for maintenance and for connection of suitable conduits for delivering cargo into, or for removal of cargo from, the interior of the cargo tank 12, and for providing fluid such as a suitable gas under pressure into the cargo tank 12 to assist in urging cargo out through the bottom outlet valve 24.

A pressure relief safety valve 96 may be mounted on its own nozzle 98 and at its own separate second opening through the tank top 28 at a location along the top of the cargo tank 12 longitudinally separate from the nozzle 40 on which the valve group and fixtures mounting plate 42 may be mounted. The nozzle 98 and an associated mounting flange 100 on which the pressure relief safety valve 96 is mounted may be spaced apart from the protective housing 82 in a longitudinal direction with respect to the cargo tank 12, by a distance 102, between the protective housing 82 and the flange 100, great enough to provide necessary space for attachment, adjustment, or removal of the pressure relief safety valve 96.

Figure 3:
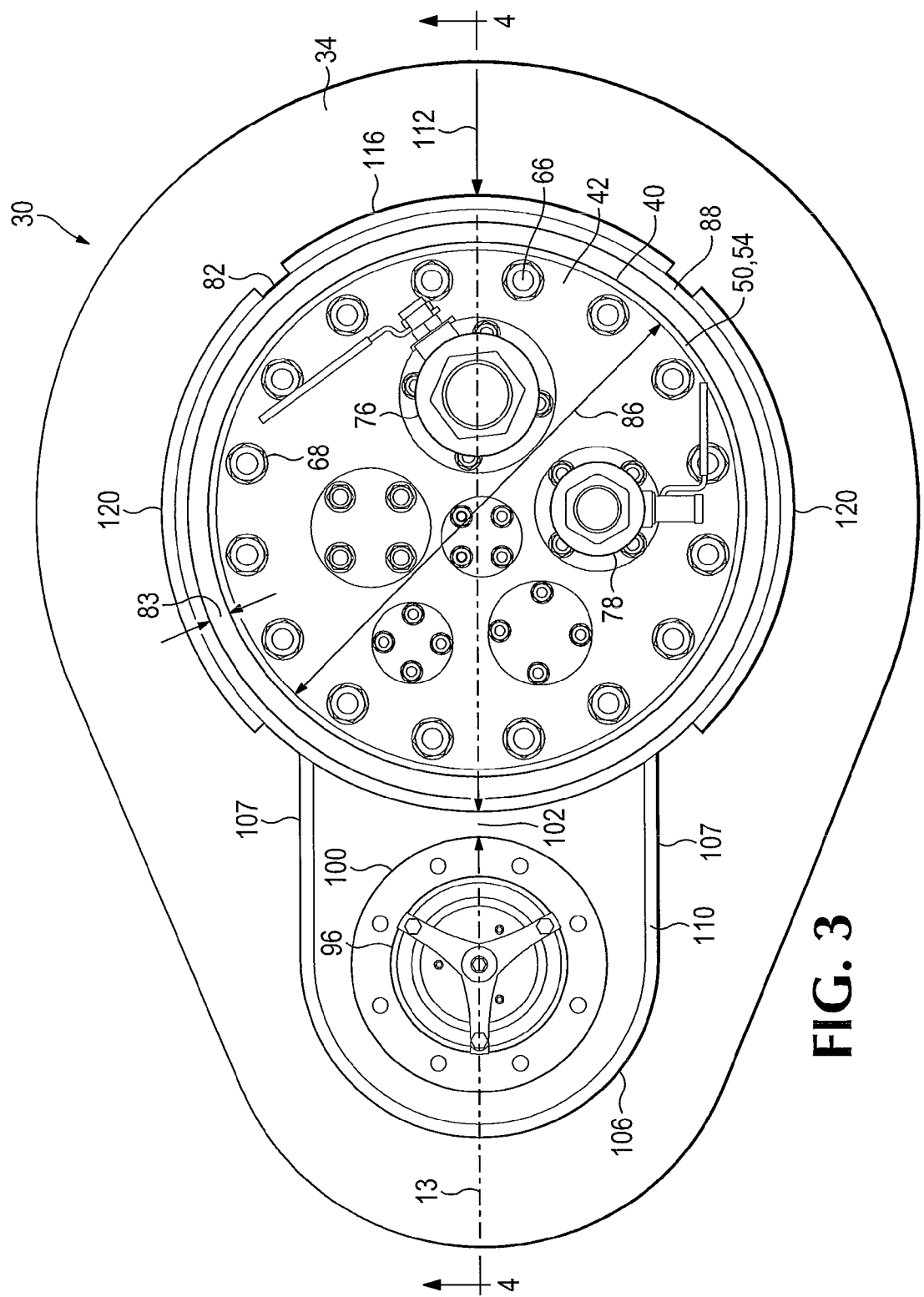
FIG. 3 is a top plan view of the protective structure shown in FIG. 2.

An auxiliary protective housing 106, which may be constructed of metal plate similar to that of the protective housing 82, surrounds the valve group and fittings mounting plate 42, and may be in the form of a "U," as seen in plan view in FIG. 3. The legs 107 of the "U" may extend parallel with each other to the protective housing 82 and may be attached to the protective housing, as by welding, leaving an upwardly-open path for fluid discharged from the pressure relief safety valve 96. A bottom margin 108 of the auxiliary protective housing 106 may be welded to the nozzle reinforcement pad 34, while an upper margin 110 of the auxiliary protective housing 106 is left uncovered so that the auxiliary protective housing 106 defines an upwardly-open around the pressure relief safety valve 96 and its associated mounting flange 100 and nozzle 98.

Figure 2:
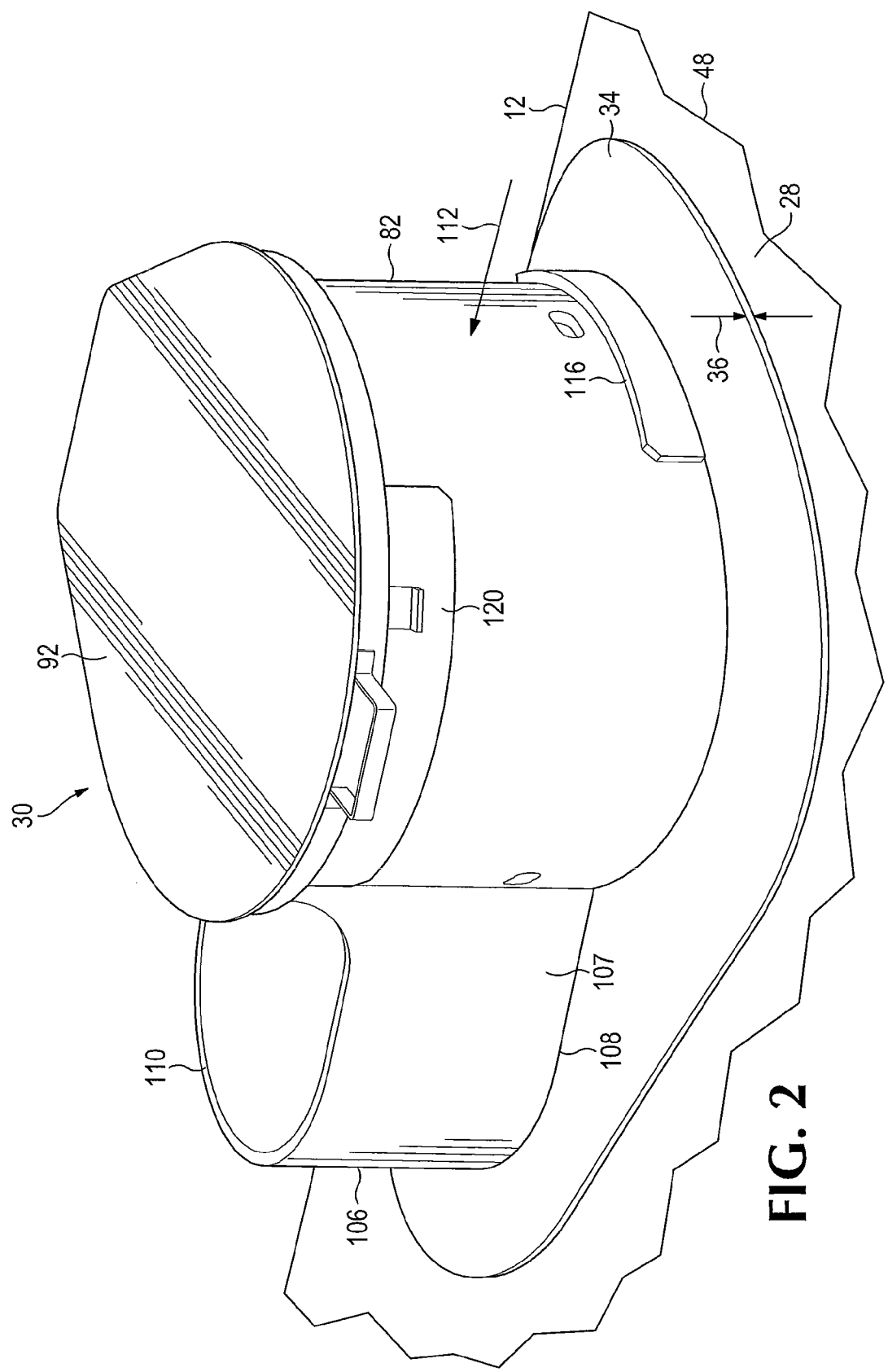
FIG. 2 is an isometric view, at an enlarged scale, of a portion of the tank car shown in FIG. 1 including the protective structure shown in FIG. 1.

The auxiliary protective housing 106 also functions as a buttress to support the protective housing 82 surrounding the valve group mounting plate against forces applied to the right side of the protective structure 30 as indicated by the arrow 112 in FIG. 2.

Figure 7:
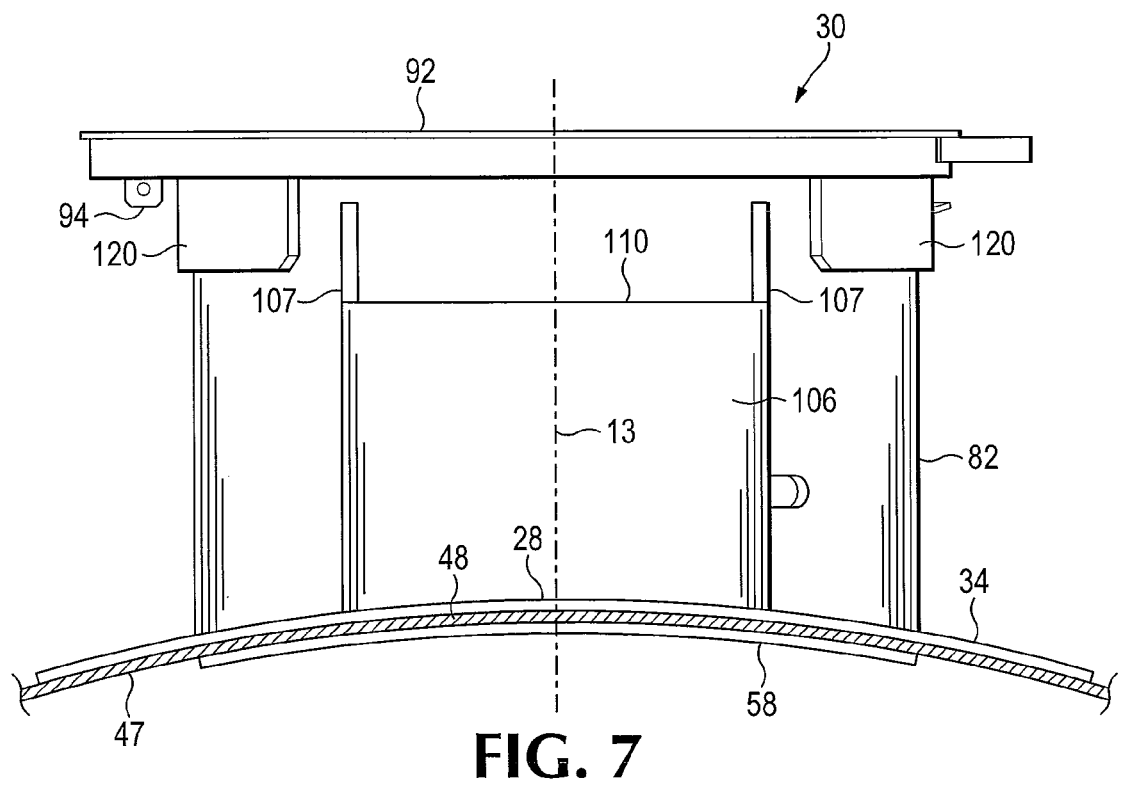
FIG. 7 is an end elevational view taken in the direction of the line 7-7 in FIG. 3.

A horizontally oriented oblong doubler plate 116 is fastened, as by welding, to the lower portion of the protective housing 82, as may be seen best in FIG. 7, thus strengthening the protective housing 82 near the tank top 28 and the valve group and fittings mounting plate 42. A pair of similar doubler plates 120 of slightly greater size are also mounted on the opposite lateral sides of the protective housing 82 near its top 88, as may be seen in FIGS. 1, 2, 3, 6, and 7, where they may function to stiffen the protective housing 82 and help it to resist deformation in the event of forces applied to it in the direction of the arrow 112.

The tank top 28 may also be provided with a manway nozzle 124 connected with and extending upward from a related opening through the tank top 28. The tank top 28 may be suitably reinforced around the manway nozzle 124, as by a doubler plate 126 of suitable strength extending radially outward from the manway nozzle 124 and welded to the exterior of the tank shell plating 48. The manway nozzle 124 may be provided with a closure member, such as a conventional manway cover 128 attached by suitable fasteners such as pivoted eyebolts 130 and nuts. The cover 128 may be connected with the nozzle 124 by a hinge 130 permitting the cover 128 to be opened to provide access for personnel to inspect or repair the interior of the cargo tank 12. Such a manway nozzle 124 need not extend upward above the tank top 28 more than a minimal distance, and is therefore less likely to be damaged than the valves and other fittings protected by the protective structure 30.

The cargo tanks 12 of some railway tank cars 10 intended to carry some types of cargo may be jacketed with a layer of a thermal insulation (not shown), which may overlap the doubler pad 34 in the vicinity of the protective structure 30.

Figure 8:
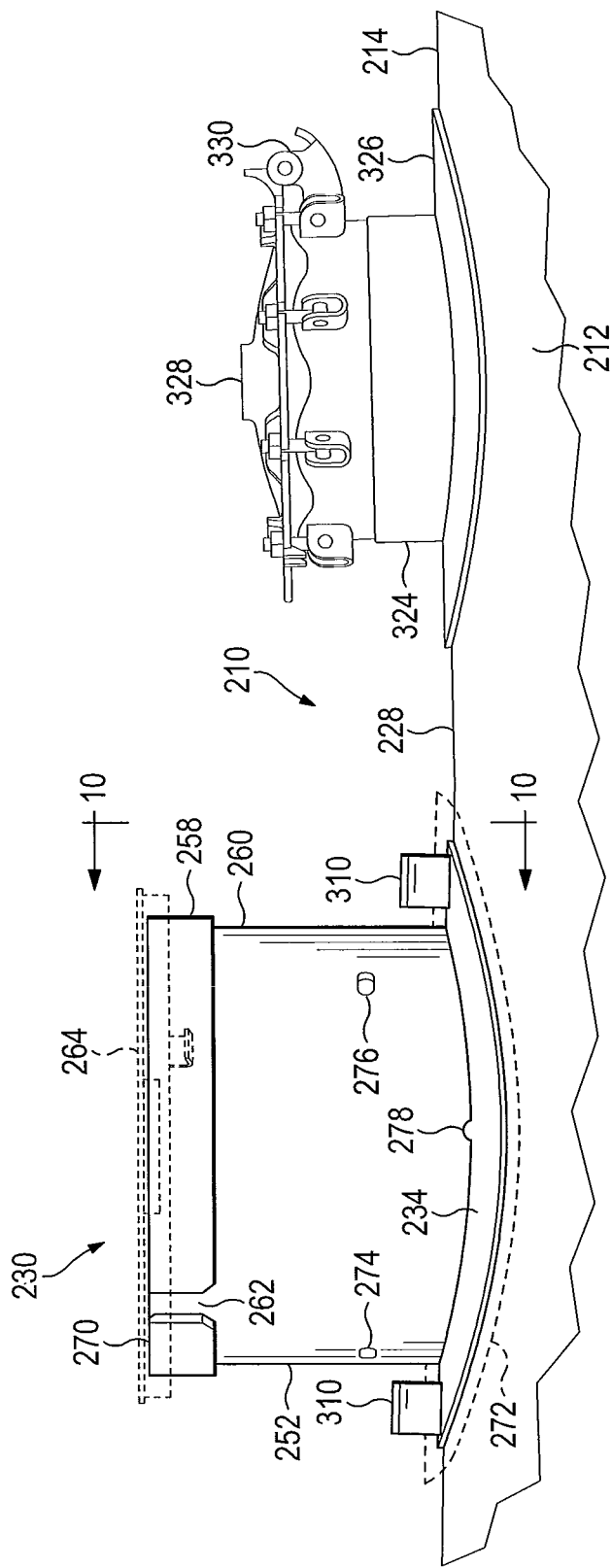
FIG. 8 is a side elevational view of a tank top portion of a railway tank car including a protective structure intended to protect a tank top valve group mounting nozzle of the tank car, embodying an aspect of the invention disclosed herein.
Figure 9:
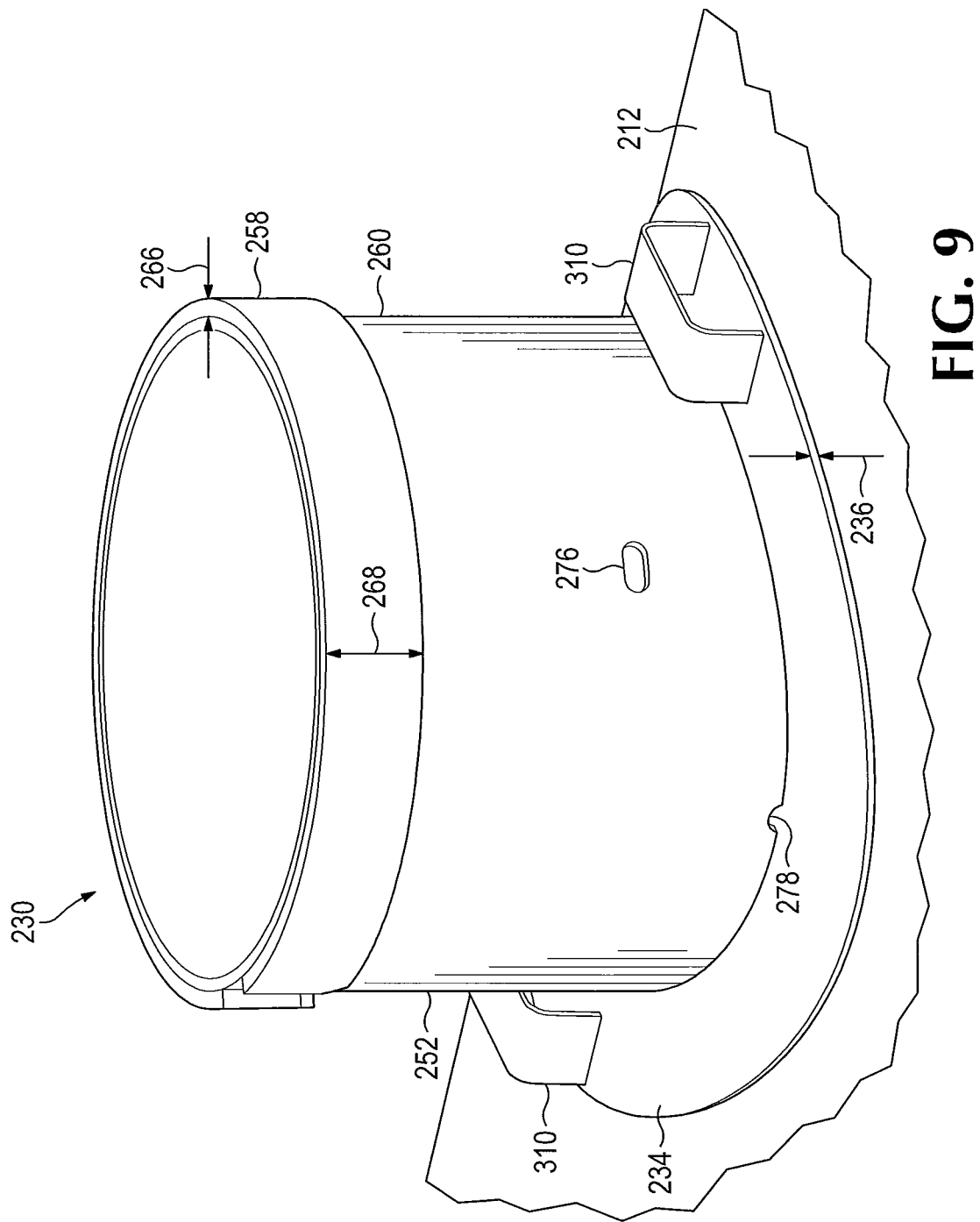
FIG. 9 is an isometric view of a part of the portion of a tank car shown in FIG. 8 including the protective structure shown in FIG. 8.

Referring next to FIGS. 8-13 of the drawings which form a part of the disclosure herein, a portion 210 of a railroad tank car, shown in FIG. 8, may include a generally elongate cylindrical cargo tank 212 that is generally similar to the cargo tank 12 shown in FIG. 1 above. The cargo tank 212 may include a tank wall 214 and a pair of opposite ends (not shown) similar to those of the cargo tank 12. The cargo tank 212 may define a longitudinally extending vertical central plane 220 (seen in FIG. 11) and may have a tank top 228. The cargo tank 212 may be constructed with significant rigidity and strength not only to carry and contain liquid cargo, but also to be self-supporting, and to bear the longitudinal train loads exerted on the tank car during travel.

Located about mid-length of the tank car 210 and centrally along the top 228 of the cargo tank 212 is a nozzle 240, that may be of a conventional construction, and that includes a mounting flange 242, to which is attached a closure member such as a valve group and fittings mounting plate 244 on which at least two valves, such as a three-inch diameter cargo delivery and removal valve 246 and a two-inch diameter pressurized fluid admission valve 248 may be mounted. A protective structure 230 is designed to protect the nozzle 240 and the associated fittings and valves. As shown in FIGS. 8-13, the protective structure 230 may be attached to a doubler plate such as a tank top reinforcement plate 234, which, in one embodiment, is welded to an outer surface of the tank top 228 of the cargo tank 212. The tank top reinforcement plate 234 may be circular in shape as seen in plan view in FIG. 11, and may be bent arcuately to conform to the shape of the tank top 228. The tank top reinforcement plate 234 may have a thickness of 236 of, for example, 0.5 inch, and closely surround the nozzle 240, extending radially outward around it.

The valve group and fittings mounting plate 244 is provided with holes arranged to fit an array of bolts 250, which secure the mounting plate 244 to the mounting flange 242. The valves 246 and 248 and other fittings may be mounted in various other openings in the mounting plate 244. The cargo delivery and removal valve 246 may be connected with a fill pipe that extends nearly to the bottom of the cargo tank 212 to deliver cargo into the cargo tank 212. The fluid admission valve 248 may be used for introduction of pressurized air to aid in emptying the cargo tank 212, for example.

Figure 12:
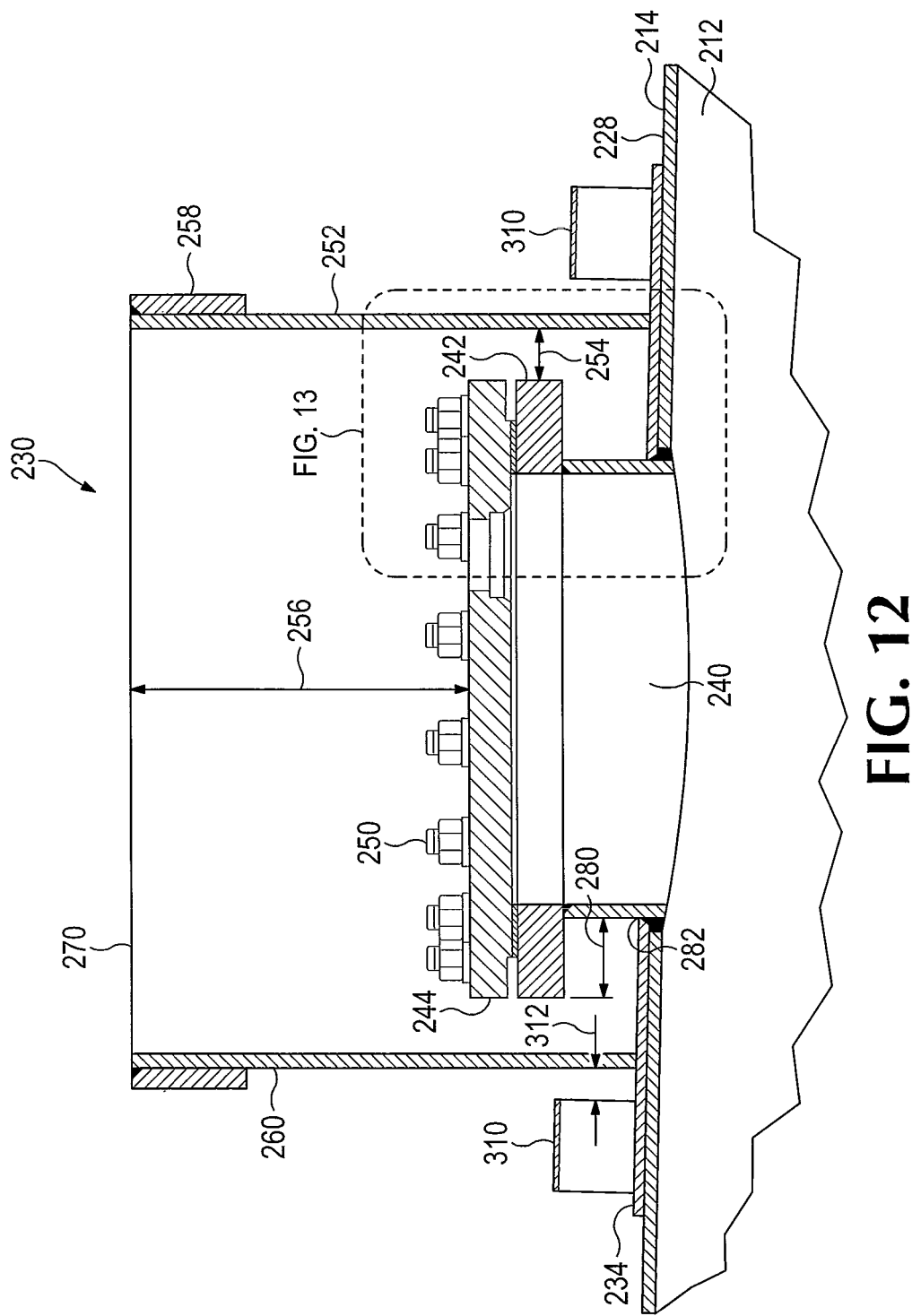
FIG. 12 is a sectional view of the protective structure, taken along line 12-12 in FIG. 11.
Figure 13:
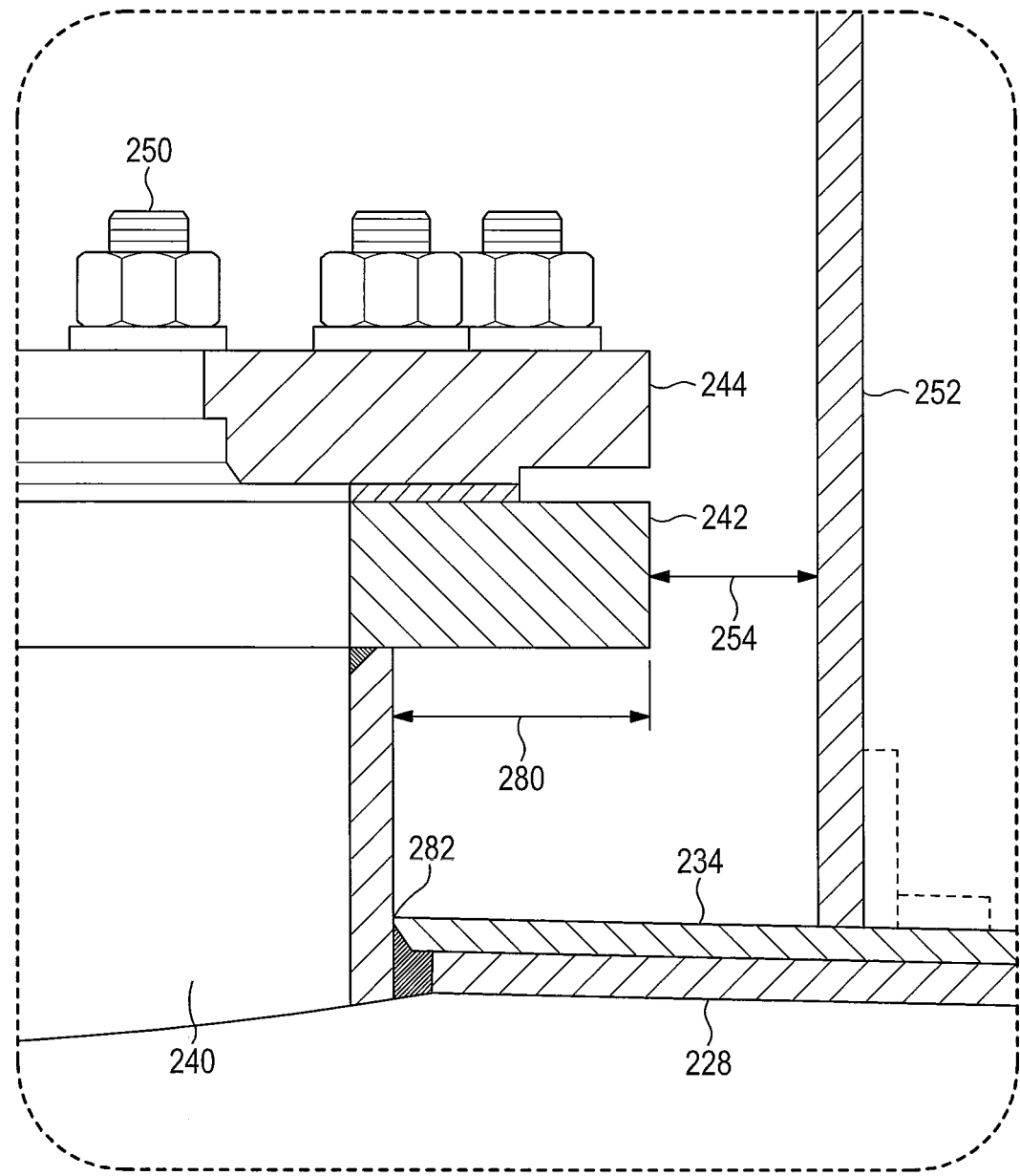
FIG. 13 is a detail view, at an enlarged scale, of a portion of the sectional view of FIG. 12 outlined in broken line.

The height of the mounting flange 242 from the tank top reinforcement plate 234 is dependent upon the distance of the radial overhang 280 to provide access for welding at the intersection between the reinforcement plate 234 and the nozzle 240, at 282, as seen best in FIGS. 12 and 13.

The protective structure 230 includes an upstanding wall 252, which may be of steel or other metal plate, that encircles the nozzle 240, the mounting flange 242, and the associated fittings mounting plate 244. The upstanding wall 252 is fastened securely to the cargo tank 212, as by being welded to the tank top reinforcement plate 234. The upstanding wall 252 is located radially outwardly, apart from the mounting flange 242 and the fittings mounting plate 244, by a radial clearance distance 254 of, for example, about 3 inches in one embodiment. This distance affords room for use of tools to tighten or loosen the bolts 250 attaching the mounting plate 244 to the flange 242, as well as providing protected space around the nozzle 240 and the valves 246 and 248 or other fittings mounted on the mounting plate 244.

The protective structure 230 may also be added to a conventional tank car to protect an existing nozzle. In adding the protective structure 230 to protect an existing nozzle, an additional reinforcement pad 272, shown in broken lines in FIG. 8, shaped to conform with the tank top, may be added to extend the doubler plate 234 further radially from the existing nozzle.

The upstanding wall 252 of the protective structure 230 may be of a suitable high-strength steel such as, for example, A516 GR 70 plate 0.625 inch thick, although a higher strength steel or greater thickness may be determined by engineering calculations to be better able to withstand potential forces, depending on the size and the capacity of the cargo tank 212.

The upstanding wall 252 has a height 256 above the valve and fittings mounting plate 244, so as to extend at least slightly beyond the height of the tallest of the valves 246 and 248 normally mounted on the mounting plate 244, in order to provide protection for the valves in case of a rollover of the tank car 210. The height 256, and the location of the wall 252 spaced radially outward from the nozzle 240, provides room for inward deformation of the wall 252.

In the event that the tank car 210 is overturned, the upstanding wall 252 may be deformed inwardly toward the nozzle 240 and the fittings mounting plate 244, but should in most cases protect the valves 246 and 248 from serious damage.

In order to reinforce the protective structure 230, and particularly the upstanding wall 252, to resist deformation, a wall reinforcing member 258, which may also be called a fittings protection band, may be fastened, as by welding, to the upper portion of the upstanding wall 252. The reinforcing member may extend along substantially the entire upper margin 260, and at least a majority of the circumference of the wall 252. The bottommost portion of the reinforcing member may be located at a distance of several inches above the top face of the mounting plate 244. A gap in the reinforcement band may be provided as a location for a hinge 262 by which a lid 264, shown in broken line in FIG. 8, may be attached. While the wall-reinforcing member 258 as shown is located on the outside of the wall 252, it will be appreciated that it might instead be on the inside of the wall. The upstanding wall 252, with its upper margin 260 reinforced by the reinforcing member 258, provides a rigid, strong cylindrical protective structure around the valves 246 and 248, protecting them from being broken off and thereby allowing cargo to leak from the cargo tank 212. Since the upstanding wall 252 is spaced radially outwardly apart from the mounting flange 242 at the top of the nozzle 240, ample space is provided for inward deformation of the upstanding wall 252 and its reinforcing member 258 by a distance of at least several inches without the valves 246 and 248 being subject to impact and damage.

The wall-reinforcing member 258 may have a radial thickness 266 of 0.875 inch and a height, or depth, 268, of about 5 inches, for example, so as to reinforce and stiffen the uppermost portion of the upstanding wall 252, which is potentially the most vulnerable portion of the protective structure 230. An uppermost margin of the reinforcing member 258 may be located flush with the top of the upstanding wall 252.

Figure 10:
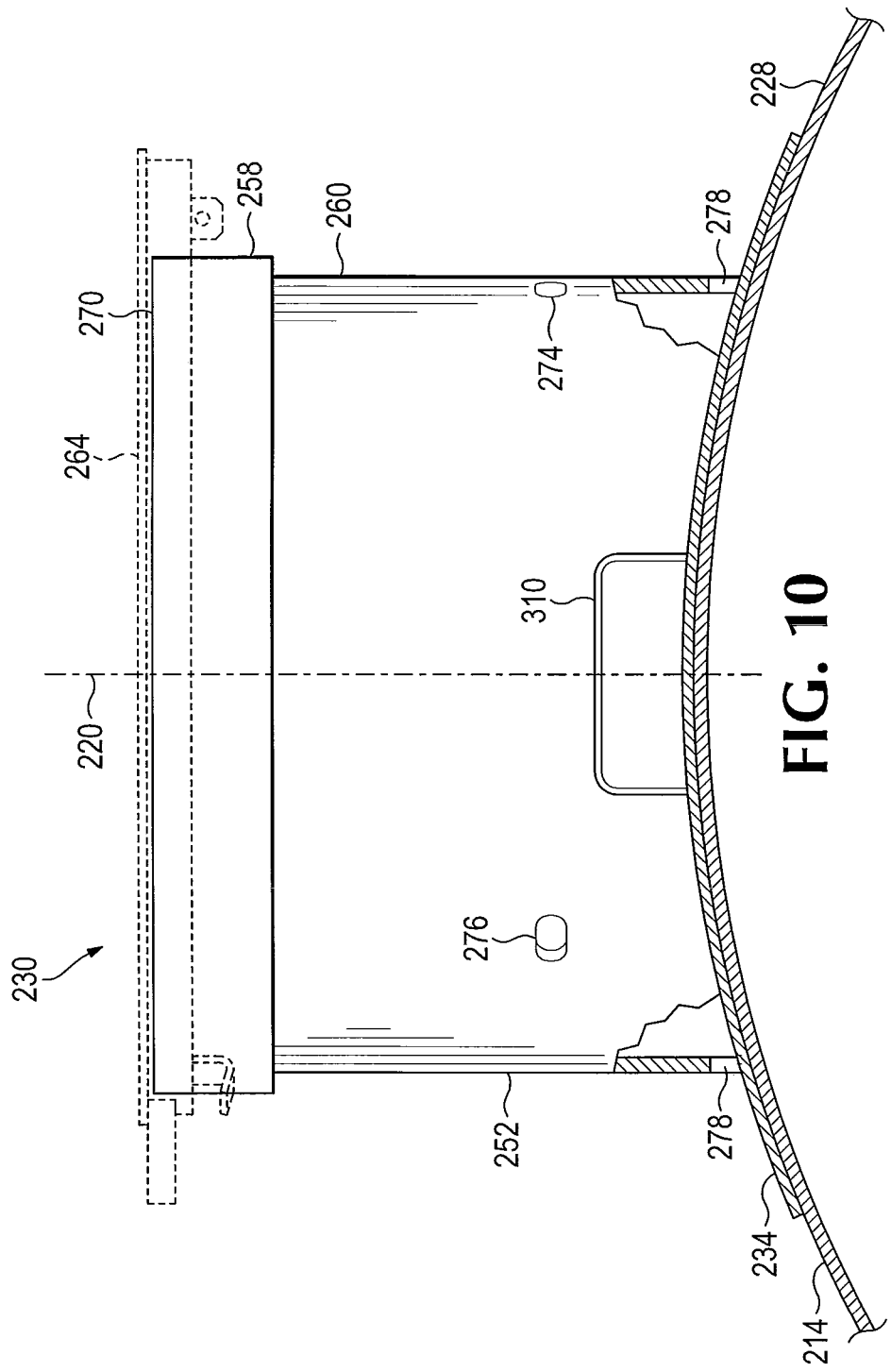
FIG. 10 is an end elevational view of the portion of the tank car shown in FIG. 8.
Figure 11:
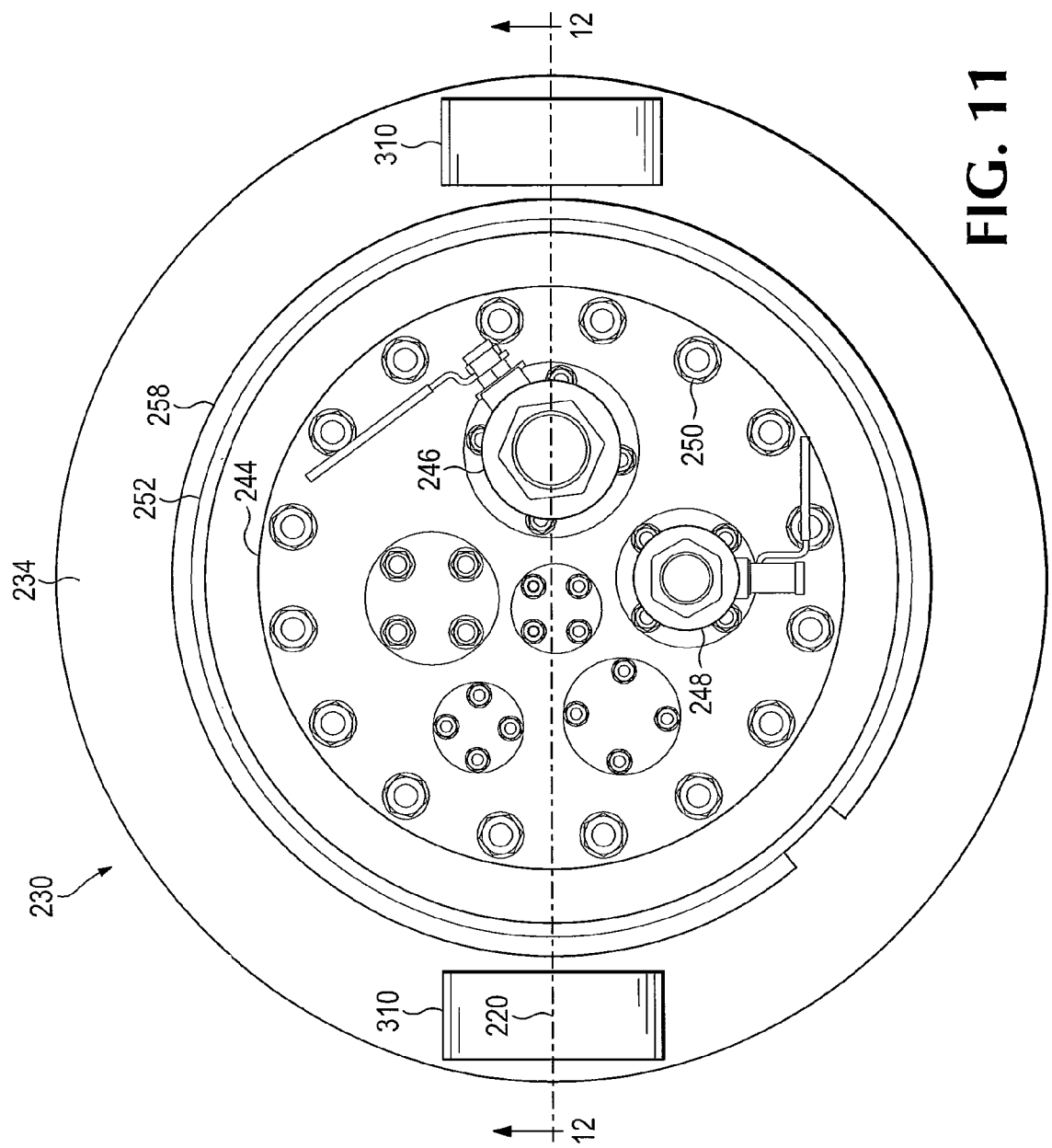
FIG. 11 is a top plan view of the portion of tank car shown in FIG. 9, including the protective structure shown in FIGS. 8 and 9.

Shown in broken lines in FIGS. 8 and 10, the lid 264 may be mounted on the top 270 of the protective structure 230 by the hinge 262 so as to cover the space defined within the protective structure 230 surrounding the valve group nozzle 240 and the associated valves. The hinged lid 264 can thus protect the valves 246 and 248 on the mounting plate 244 from the weather and from tampering, and may be secured in a manner by which any tampering is clearly evident, such as by a hasp and padlock arrangement with an accompanying tamper-evident seal (not shown) to connect the opposite side of the lid 264 to the protective structure 230. The lid 264 may be raised when appropriate, as to allow for access to the valves 246 and 248 and other fittings for maintenance and for connection of suitable conduits for delivering cargo into, and for removal of cargo from, the interior of the cargo tank 212.

The cargo tanks 212 of some railway tank cars 200 intended to carry some types of cargo may be jacketed with a layer of thermal insulation (not shown), which may overlap the doubler plate 234 in the vicinity of the protection structure 230. Insulation brackets 310 may also be mounted on the top of the cargo tank 212, at a distance 312 from the wall 252 of the protection structure 230 to support a portion of a jacket of insulating material. The height of the insulation bracket can be 4 inches from the top of the cargo tank 228 to the top of the bracket 310.

Openings 274 and 276 may be provided through the upstanding wall 252 at a height above the tank top 228 slightly greater than the height of the top of the mounting plate 244 in order allow visual inspection, and a drain hole 278 may be provided at or in the lowest point within the space defined by the upstanding wall 252 on each side of the tank top 228 to permit rainwater or leaked fluids to drain from the space within the protective structure 230. In the case of a jacketed tank car, an appropriate conduit may be provided at the drain holes 278 to carry such fluids downwardly away from the protective structure 230 and outwardly through the insulative jacket around the cargo tank 212.

The tank top 228 may also be provided with a manway nozzle 324 connected with and extending upward from a related opening through the tank top 228 located a distance (such as twelve inches) away from the nozzle 240. The tank top 228 may be suitably reinforced around the manway nozzle 324, as by a doubler plate 326 of suitable strength extending radially outward from the manway nozzle 324 and welded to the exterior of the tank shell plating 248. The manway nozzle 324 may be provided with a closure member, such as a conventional manway cover 328 attached by suitable fasteners such as pivoted eyebolts and nuts. The cover 328 may be connected with the nozzle 324 by a hinge 330 permitting the cover 328 to be opened to provide access for personnel to inspect or repair the interior of the cargo tank 212. Such a manway nozzle 324, since it need not have any upwardly projecting valves, need not extend upward above the tank top 228 by more than a minimal distance, and is therefore less likely to be damaged than the valves and other fittings protected by the protective structure 230.

The terms and expressions that have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. A railway tank car comprising:
   (a) an elongate, cylindrical cargo tank for containing fluid cargo, the cargo tank having a tank wall and a tank top;
   (b) an opening defined through the tank wall at the tank top;
   (c) a nozzle extending upwardly from the opening, the nozzle including a mounting flange located at an upper end of the nozzle;
   (d) a fittings protective structure, including an upstanding wall having an upper portion, the upstanding wall surrounding the nozzle and defining a space surrounding the nozzle, the upstanding wall being separate from and spaced radially outwardly apart from the nozzle and the mounting flange and free from connection to either of the nozzle and the mounting flange, the upstanding wall extending upward from a part of the tank top located radially outwardly apart from the nozzle, and being located at a radial clearance distance away from the mounting flange; and
   (e) a reinforcing band attached to and conforming to said upper portion of said upstanding wall and spaced upwardly apart from the tank top.

2. The railway tank car of claim 1 including a tank top reinforcement member surrounding the nozzle and mounted on an exterior of the tank wall.

3. The railway tank car of claim 2, wherein the tank top reinforcement member is a doubler plate welded to the tank top.

4. The railway tank car of claim 2, wherein the tank top reinforcement member is shaped to conform to the tank top.

5. The railway tank car of claim 1 wherein said radial clearance distance from the mounting flange is about 3 inches.

6. The railway tank car of claim 1, the fittings protective structure including a lid removably mounted on the upper portion of the protective structure covering and closing an upper end of the space defined within the fittings protective structure.

7. The railway tank car of claim 1, wherein the tank car has a vertical longitudinal central plane and a pair of opposite ends.

8. The railway tank car of claim 1 wherein the mounting flange extends radially outwardly from the upper end of the nozzle.

9. The railway tank car of claim 1 wherein the space including the nozzle, defined by the fittings protective structure, is a generally cylindrical space.

10. The railway tank car of claim 1 wherein the upstanding wall has an upper margin and the reinforcing band is attached to the upstanding wall adjacent the upper margin thereof.

11. The railway tank car of claim 1 wherein the reinforcing band extends around at least a majority of a circumference of the upper portion of the upstanding wall.

12. A protective structure for protecting fittings mounted on a tank top nozzle of a fluid cargo tank of a railroad car, comprising:
   (a) a tank top reinforcement plate shaped to conform to a tank top of the fluid cargo tank and defining a central opening therethrough;
   (b) an upstanding wall of metal plate located radially outwardly apart from and surrounding the central opening, the upstanding wall being free from connection to the tank top nozzle and being spaced radially outwardly apart from the tank top nozzle and thereby defining an enclosure surrounding the tank top nozzle, and the upstanding wall having a lower margin welded to the tank top reinforcement plate; and
   (c) a reinforcing band attached to and conforming to and extending along an upper portion of the upstanding wall.

13. The protective structure of claim 12, including a lid mounted on the upper portion of the upstanding wall and covering the enclosure defined by the upstanding wall.

14. The protective structure of claim 13, wherein the lid is attached to the upper portion of the protective structure by a hinge and is held in a closed configuration by a tamper-evident closure fastening.

15. A method of protecting fittings on a tank top nozzle of a railway tank car, comprising:
   (a) providing a fittings protecting structure including an upstanding wall, the upstanding wall having a bottom end configured to fit atop a tank top of the railway tank car; and
   (b) mounting the fittings protecting structure on the tank top in a position where the upstanding wall is separate from and not interconnected with the tank top nozzle, thereby defining an enclosure with the upstanding wall surrounding and extending upwardly above the tank top nozzle and spaced radially outwardly apart from the tank top nozzle, as well as from a mounting flange and a fittings mounting plate located at an upper end of the nozzle.

16. The method of claim 15 including the steps of attaching a reinforcing doubler plate member to the tank top of the railway tank car, surrounding the nozzle, with the reinforcing doubler plate member conforming to the tank top and extending radially outwardly away from the nozzle, and welding the bottom end of the upstanding wall to an upper surface of the reinforcing doubler plate member.

17. The method of claim 15 including the step of mounting a lid on the upper end of the upstanding wall in a position covering and closing an upper end of a space defined by the upstanding wall and that includes the nozzle and fittings.

18. The method of claim 15 wherein the step of mounting the fittings protection structure includes defining a generally cylindrical enclosure surrounding the tank top nozzle.

19. The method of claim 15 including the step of reinforcing an upper portion of the upstanding wall by mounting a reinforcing band on the upstanding wall near an upper end of the upstanding wall, conforming to and extending around at least a majority of a circumference of the upstanding wall so as to reinforce an upper portion of the upstanding wall.

20. The method of claim 15 including the step of providing said upstanding wall with sufficient height to extend at least to a height of a tallest fitting on the tank top nozzle.

\* \* \* \* \*